United States Patent [19]

Ishikawa et al.

[11] Patent Number: 4,554,231
[45] Date of Patent: Nov. 19, 1985

[54] ELECTROPHOTOGRAPHIC PHOTOSENSITIVE MEMBER

[75] Inventors: Shozo Ishikawa, Sayama; Kiyoshi Sakai, Mitaka; Minoru Mabuchi, Tokyo; Katsunori Watanabe, Yamato; Makoto Kitahara, Yokohama, all of Japan

[73] Assignees: Canon Kabushiki Kaisha; Copyer Kabushiki Kaisha, both of Tokyo, Japan

[21] Appl. No.: 560,255

[22] Filed: Dec. 9, 1983

Related U.S. Application Data

[63] Continuation of Ser. No. 299,575, Sep. 4, 1981, abandoned.

[30] Foreign Application Priority Data

Sep. 26, 1980 [JP] Japan ................. 55-132966
Sep. 26, 1980 [JP] Japan ................. 55-132967
Sep. 26, 1980 [JP] Japan ................. 55-132969
Oct. 6, 1980 [JP] Japan ................. 55-138714
Oct. 6, 1980 [JP] Japan ................. 55-138715

[51] Int. Cl.[4] .................... G03G 5/06; G03G 5/14
[52] U.S. Cl. .................... 430/59; 430/70; 430/71; 430/72; 430/73; 430/76; 430/77; 430/78; 564/251
[58] Field of Search ............ 430/58, 59, 70, 71, 430/72, 73, 76, 77, 78; 564/251

[56] References Cited

U.S. PATENT DOCUMENTS

| | | | |
|---|---|---|---|
| 3,142,658 | 7/1964 | Stewart | 564/250 X |
| 3,378,554 | 4/1968 | Puschel et al. | 564/251 X |
| 3,684,502 | 8/1972 | Gramza et al. | |
| 3,775,102 | 11/1973 | Kukla | |
| 3,837,851 | 9/1974 | Shattuck et al. | |
| 3,870,516 | 3/1975 | Smith et al. | |
| 3,894,868 | 7/1975 | Regensburger | |
| 4,150,987 | 4/1979 | Anderson et al. | 430/58 |
| 4,256,821 | 3/1981 | Enomoto et al. | 430/59 |
| 4,278,747 | 7/1981 | Murayama et al. | 430/70 X |
| 4,297,426 | 10/1981 | Sakai et al. | 430/58 X |
| 4,356,246 | 10/1982 | Tabei et al. | 430/58 X |
| 4,403,025 | 9/1983 | Horie et al. | 430/59 |

FOREIGN PATENT DOCUMENTS

| | | | |
|---|---|---|---|
| 2908123 | of 0000 | Fed. Rep. of Germany | 430/58 |
| 54-143645 | 11/1979 | Japan | 430/58 |
| 930988 | 7/1963 | United Kingdom | 430/70 |
| 2034493A | 6/1980 | United Kingdom | |
| 2034494A | 6/1980 | United Kingdom | |
| 2055803A | 3/1981 | United Kingdom | |

Primary Examiner—Roland E. Martin

Attorney, Agent, or Firm—Fitzpatrick, Cella, Harper & Scinto

[57] ABSTRACT

An improved electrophotographic photosensitive member is composed of a layer containing a hydrazone compound represented by the formula

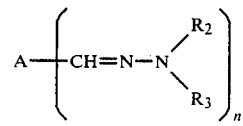

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not simultaneously alkyls, n is 1 or 2, when n is 1, A represents

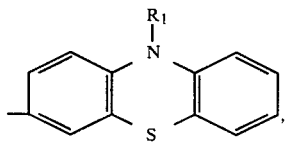

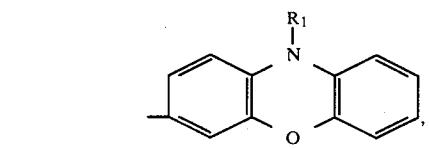

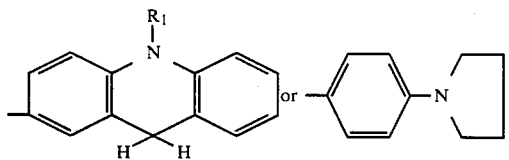

wherein $R_1$ is $C_1$–$C_5$ alkyl, unsubstituted aralkyl, or substituted aralkyl, and when n is 2, A represents a direct single bond between two

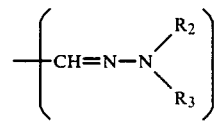

radicals.

18 Claims, No Drawings

ELECTROPHOTOGRAPHIC PHOTOSENSITIVE MEMBER

This application is a continuation of application Ser. No. 299,575 filed Sept. 4, 1981, now abandoned.

BACKGROUND OF THE INVENTION

1. Field of the Invention

The present invention relates to electrophotographic photosensitive members and more particularly to electrophotographic photosensitive members containing hydrazone group compounds.

2. Description of the Prior Art

Inorganic photoconductive substances such as selenium, cadmium sulfide, and zinc oxide have so far been used over a wide range in photosensitive layers of electrophotographic photosensitive members. The photosensitive members employing such inorganic photoconductors involve various disadvantages along with several advantages. Examples of the disadvantages are as follows: In the case of selenium, the production cost of the photosensitive member is high because of its low productivity, severe conditions of production, and loss of the raw material, which are attributable to the vacuum deposition process, and in addition the deposited film of selenium itself has extremely poor resistance to heat and mechanical shocks and is very liable to crystallize under certain environmental conditions. In the case of a photosensitive member made of cadmium sulfide, the photosensitive member stored under high humidity cannot exhibit stable sensitivity or durability upon using. In the case of a photosensitive member made of zinc oxide, the photosensitive member is subject to charge deterioration and light fading due to corona charging, since the sensitization is effected by use of a dye of poor fastness, typified by Rose Bengal. This type of photosensitive member has also disadvantages in smoothness, hardness, and wear resistance of the photosensitive layer surface thereof because it is a dispersion system of zinc oxide particles in a resin.

In contrast to inorganic photoconductive substances, organic ones have the advantage of giving a highly flexible photosensitive layer and photosensitive members of stable electrophotographic characteristics with ease and low costs, so that in recent years many proposals have been made.

The following types of photosensitive members are known as those employing organic photoconductive substances:

(1) A charge-transfer complex is formed by combining an electron donor with an electron acceptor (e.g. U.S. Pat. No. 3,484,237).

(2) An organic photoconductor is sensitized by addition of a dye (e.g. Japanese Patent Publication No. 25,658/1973).

(3) A pigment is dispersed in a positive hole matrix or an electronically active matrix (e.g. U.S. Pat. Nos. 3,894,868 and 3,870,516).

(4) An electrophotographic photosensitive member comprises a charge generation layer and a charge transport layer (e.g. U.S. Pat. No. 3,837,851).

(5) An electrophotographic photosensitive member comprises a co-crystalline complex containing a dye and a resin (e.g. U.S. Pat. No. 3,684,502).

(6) An organic pigment or an inorganic charge generation material is added to a charge-transfer complex (e.g. U.S. Pat. No.3,775,105).

(7) Other types.

Present aspects of these types of photosensitive members are that further improvements in sensitivity, durability, environmental stability, etc. are desired though actually useful ones are found among them.

These organic photoconductive substances for such photosensitive members include high-molecular compounds typified by poly(N-vinylcarbazole) and low-molecular compounds such as pyrazoline derivatives disclosed in U.S. Pat. No. 3,837,851.

High-molecular photoconductive substances generally give brittle coatings and are deficient in film forming property and in flexibility. Addition of a plasticizer to remove these drawbacks is accompanied by alternative drawbacks such as reduction of sensitivity. On the other hand, low-molecular ones can be freed from such drawbacks as high-molecular ones have, by choosing a proper binder, but cannot be said to be satisfactory in sensitivity, durability, and environmental stability.

Sensitivity of conventional photosensitive members, which is represented in exposure quantity for halving original potential, E ½ is about 15 lux·sec for unsensitized Se type and in the order of 4–8 lux·sec for sensitized Se type. Sensitivity of CdS type is similar to that of sensitized Se type, and that of ZnO type about 7–12 lux·sec.

As a desirable sensitivity of practical photosensitive member, E ½ value is to be 20 lux·sec or lower in the case of a usual PPC copying machine, more preferably 15 lux·sec or lower in the case of a high-speed PPC copying machine, but a photosensitive member of sensitivity lower than that mentioned above may be used.

SUMMARY OF THE INVENTION

An object of the present invention is to provide an electrophotographic photosensitive member free of the foregoing disadvantages.

Another object of the present invention is to provide an electrophotographic photosensitive member of improved sensitivity.

A further object of the present invention is to provide an electrophotographic photosensitive member having a photosensitive layer containing a specific hydrazone compound.

A still further object of the present invention is to provide an electrophotographic photosensitive member having a charge transport layer containing a specific hydrazone compound.

According to the present invention, there is provided an electrophotographic photosensitive member composed of a layer containing a hydrazone compound represented by the formula:

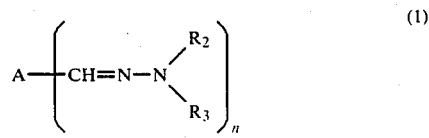

(1)

wherein $R_2$ and $R_3$ are each unsubstituted alkyl or substituted alkyl, unsubstituted aralkyl or substituted aralkyl, or unsubstituted aryl or substituted aryl with the exception that $R_2$ and $R_3$ are not alkyls at the same time, n is 1 or 2, when n is 1 A represents

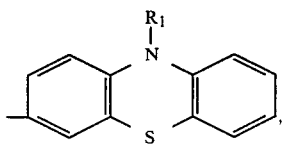

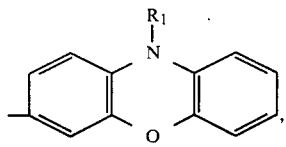

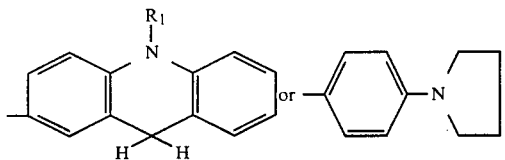

wherein $R_1$ is $C_1$–$C_5$ alkyl, unsubstituted or substituted aralkyl, and when n is 2 A represents a direct single bond between two

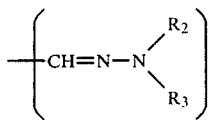

radicals.

DETAILED DESCRIPTION

The specific hydrazone compounds used in the present invention are represented by the formula:

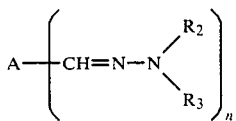 (1)

In this formula, $R_2$ and $R_3$ are each selected from the following radicals: linear or branched $C_1$–$C_5$ alkyls such as methyl, ethyl, propyl, and butyl; aralkyls such as benzyl, phenethyl, and naphthylmethyl; and aryls such as phenyl, naphthyl, anthryl, and pyrenyl. These alkyls, aralkyls, and aryls may also have substituents, which include alkoxyls such as methoxy, ethoxy, propoxy, and butoxy; dialkylamino radicals such as dimethylamino, diethylamino, dipropylamino, and dibutylamino; and halogen atoms such as chlorine, bromine, and iodine. The benzene rings or aryl radicals of these aralkyl radicals may also be substituted by alkyl radicals such as methyl, ethyl, propyl, and butyl, n is 1 or 2. When n is 1, A in formula (1) represents

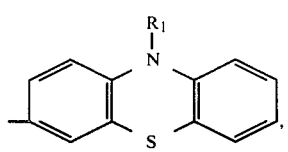

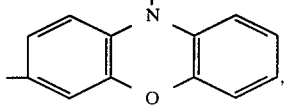

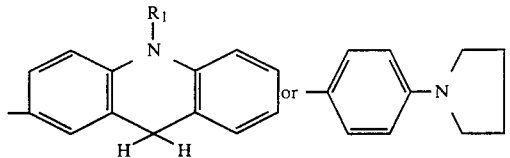

wherein $R_1$ is $C_1$–$C_5$ alkyl (e.g. methyl, ethyl, n-propyl, isopropyl, n-butyl, t-butyl, n-amyl, or t-amyl) or aralkyl (e.g. benzyl, phenethyl or naphthylmethyl), and the benzene rings of the above-mentioned aralkyl may also have the following substituents: alkyls such as methyl, ethyl, propyl, and butyl; alkoxyls such as methoxy, ethoxy, propoxy, and butoxy; dialkylamino radicals such as dimethylamino, diethylamino, dipropylamino, and dibutylamino; and halogen atoms such as chlorine, bromine, and iodine. When n is 2, A represents a direct single bond between two

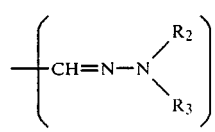

radicals.

These hydrazone compounds can be prepared in the usual way by reacting aldehyde compounds with hydrazines or with mineral acid salts thereof when n is 1, said aldehyde compounds being represented by the formula:

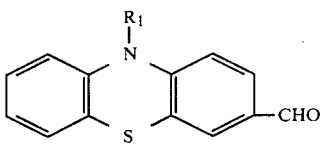 (2)

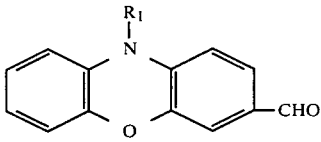 (3)

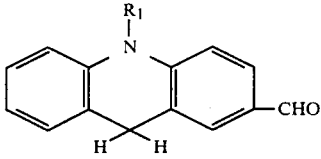 (4)

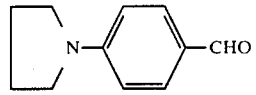 (5)

wherein $R_1$ is as defined above, and said hydrazines being represented by the formula:

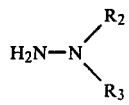

wherein $R_2$ and $R_3$ are as defined above. In other words, the hydrazone compounds can be prepared by condensation of aldehyde compounds defined above with hydrazines defined above in a solvent such as alcohol, dimethylformamide, or dimethylsulfoxide and if necessary, in the presence of a small amount of acid (glacial acetic acid or an inorganic acid) as a condensing agent.

The hydrazone compounds wherein n is 2 can be prepared in the usual way by reacting glyoxal with hydrazines defined above or with mineral acid salts thereof, that is, by condensation of the above two compounds in a solvent such as alcohol, dimethylformamide, or dimethylsulfoxide and if necessary, in the presence of a small amount of acid (glacial acetic acid or an inorganic acid) as a condensing agent.

Specific examples of the hydrazone compounds obtained by the above synthetic method will be illustrated in later examples of carrying out the invention.

Electrophotographic photosensitive members containing a hydrazone compound represented by formula (1) can be applied to any of the foregoing type, (1)–(7), of photosensitive members employing organic photoconductive substances.

According to this invention, when a hydrazone compound represented by formula (1) is used as a charge-transport material in the charge transport layer of a photosensitive member of type (4), which has two functionally separated layers, a charge generation layer and a charge transport layer, the sensitivity of the photosensitive member is particularly high and the residual potential thereof is low.

In this case, repeated use of the photosensitive member results in less reduction of both the surface potential and the sensitivity and a negligible increase in the residual potential, thus the photosensitive member being excellent in durability. Accordingly, the photosensitive member of type (4) will be explained in more detail below in this invention: The layer construction of conductive layer, charge generation layer, and charge transport layer is essential, and the charge generation layer may be laid either above or below the charge transport layer. For a repeated use type of electrophotographic photosensitive member, however, the lamination in order of conductive layer, charge generation layer, and charge transport layer from bottom to top is preferred mainly in view of mechanical strength and in certain cases in view of chargeability. A bond layer may be placed between the conductive layer and the charge transport layer for improving the adhesion.

The conductive layer to be used includes a plate or foil of metal such as aluminum, plastic film onto which aluminum or another metal has been metalized by vacuum deposition, paper or plastic film each overlaid with aluminum foil, and conductivized paper.

Effective materials for use as the bond layer are casein, poly(vinyl alcohol), water-soluble ethylene-acrylic acid copolymer, and nitrocellulose. Thickness of the bond layer is $0.1–5\mu$, preferably $0.5–3\mu$.

The charge generation layer materials are not limited to combinations with particular substances. This layer may be a vacuum-deposited layer, a layer containing a charge generation material with a binder resin, or a resin-free layer comprising a dye or pigment, of which charge generation materials are selected from a variety of materials capable of generating charge carriers at high efficiency, which include inorganic substances such as selenium, selenium-tellurium, selenium-arsenic, cadmium sulfide, and amorphous silicon and organic substances such as pyrylium dyes, thiopyrylium dyes, triarylmethane dyes, thiazine dyes, cyanine dyes, phthalocyanine pigments, perylene pigments, indigo pigments, thioindigo pigments, quinacridone pigments, squaric acid pigments, azo pigments, and polycyclic azo pigments. Thickness of the charge generation layer is $5\mu$ or less, preferably $0.01–1\mu$.

Typical examples of charge generation materials usable in this invention are recited as follows:

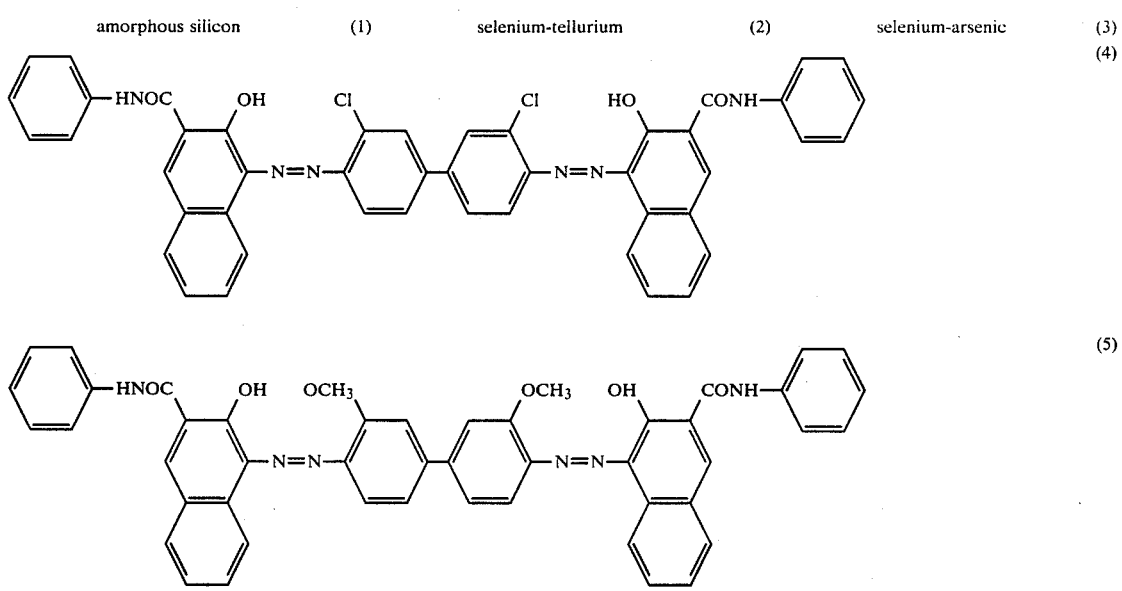

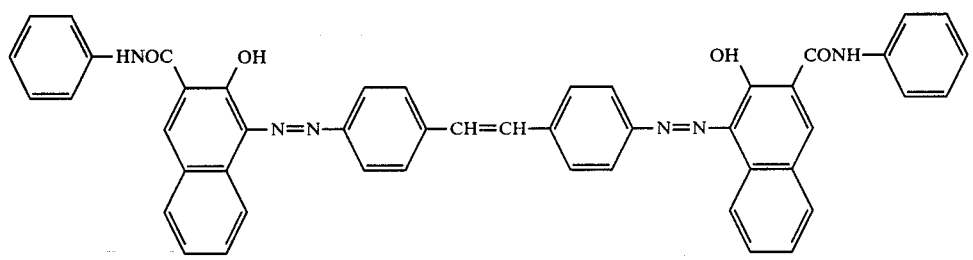
(6)
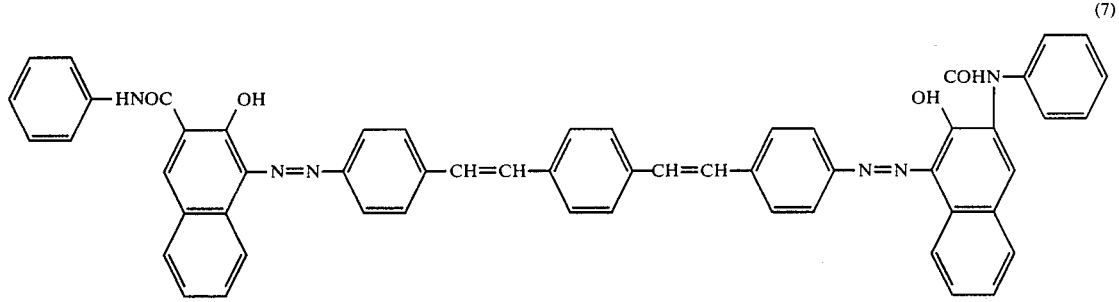
(7)
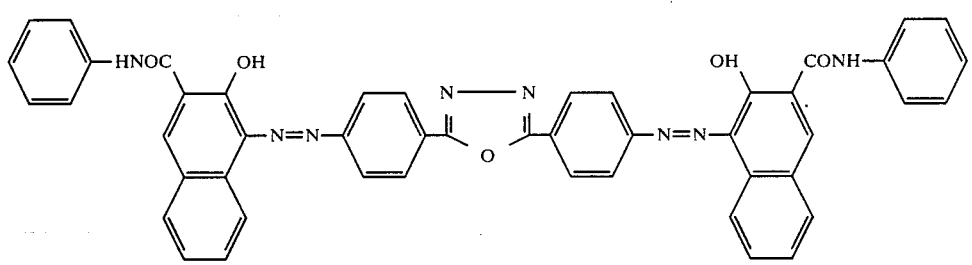
(8)
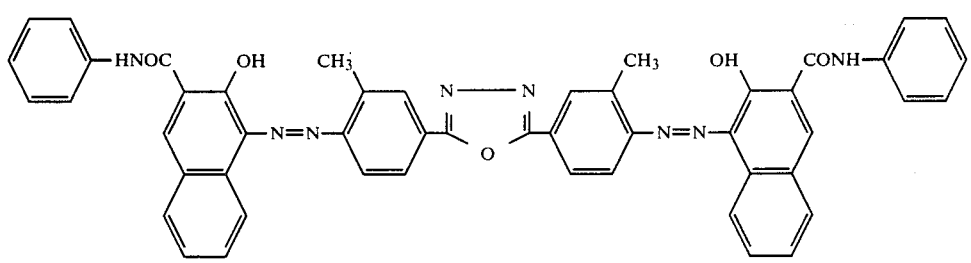
(9)
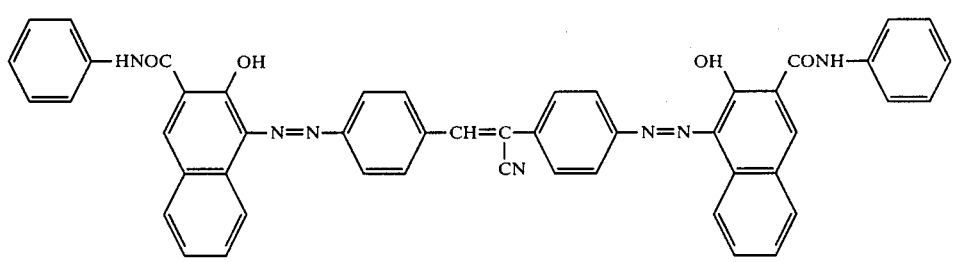
(10)
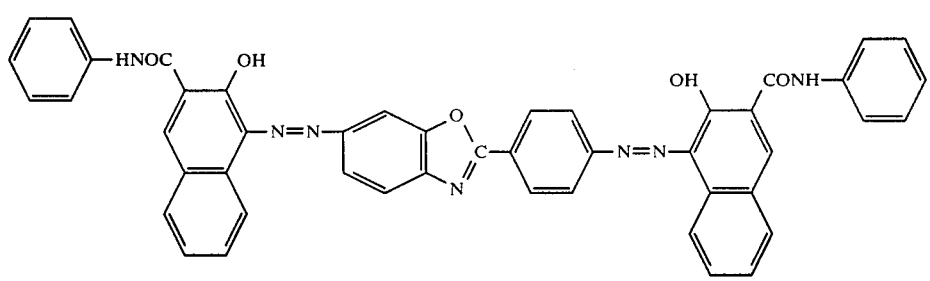
(11)

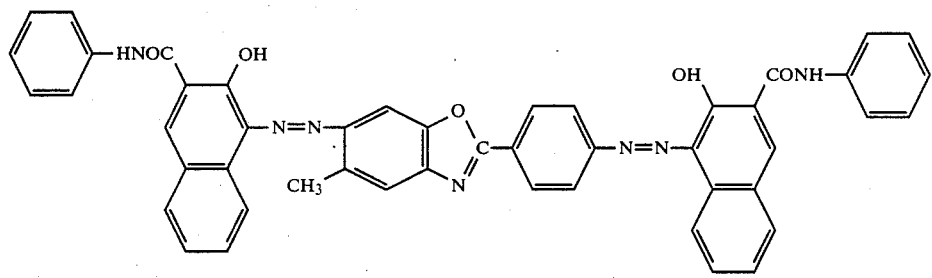
(12)
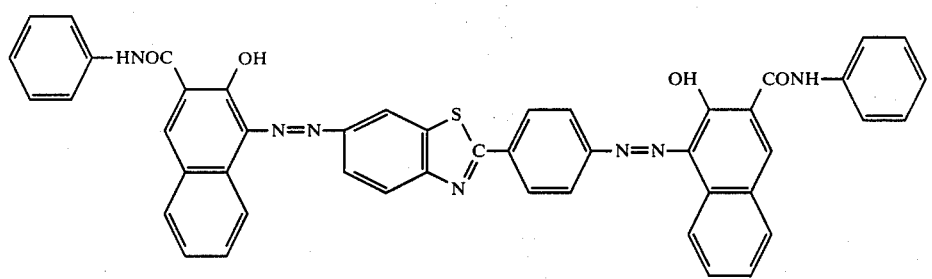
(13)
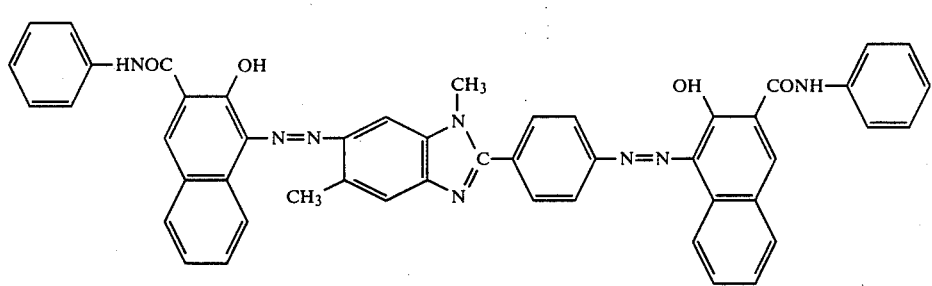
(14)
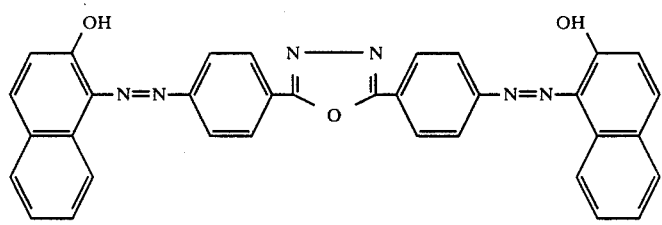
(15)
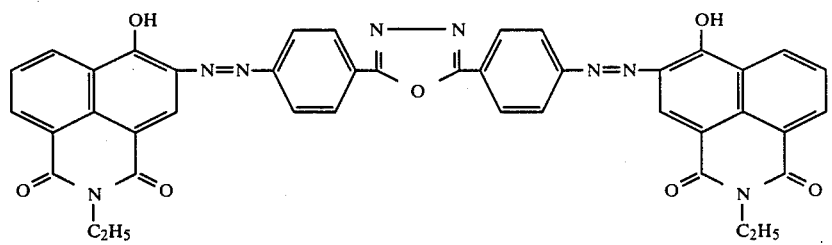
(16)
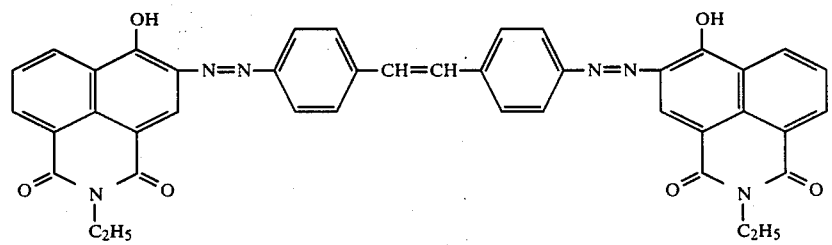
(17)

-continued

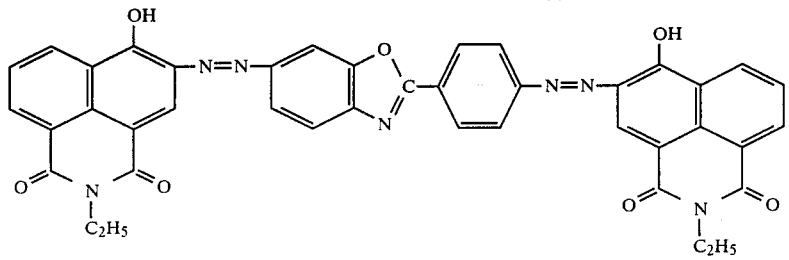 (18)

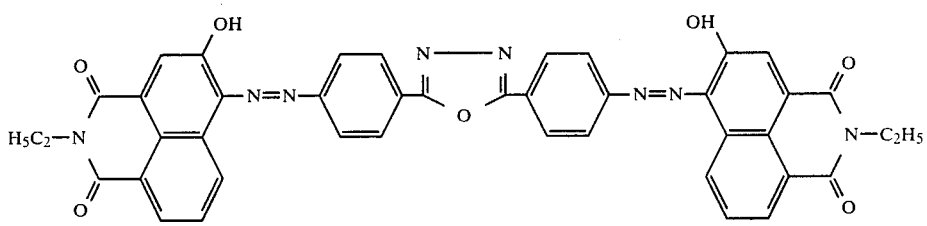 (19)

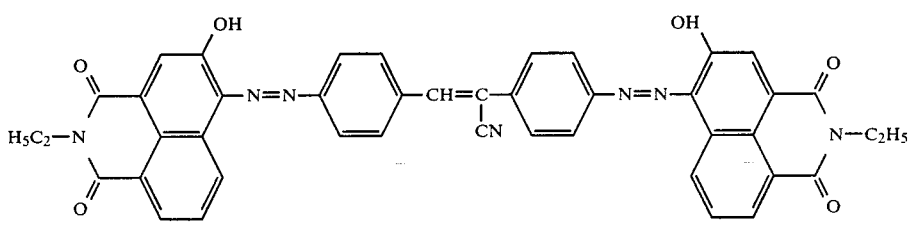 (20)

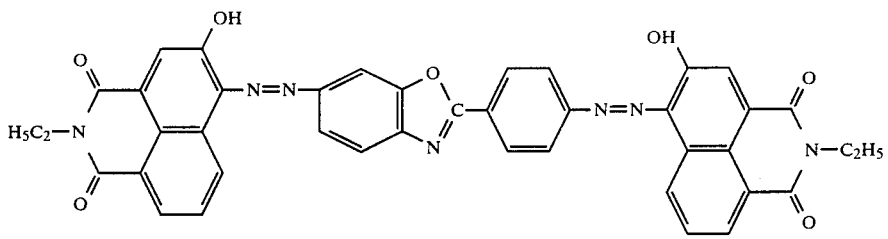 (21)

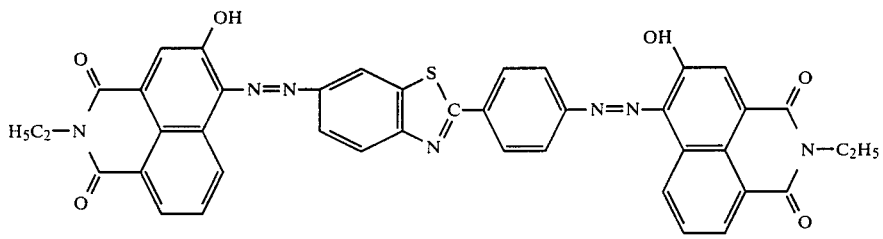 (22)

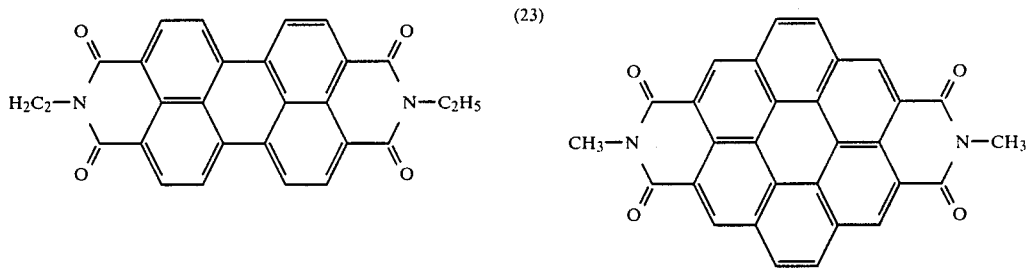 (23)

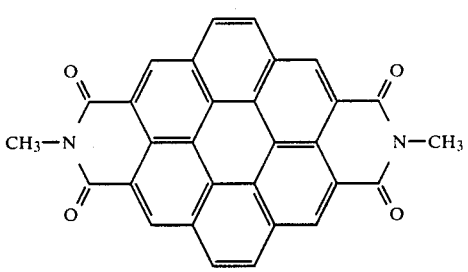 (24)

β-form copper phthalocyanine (25)

When the charge generation layer is formed by coating a dispersion of charge generation material in a resin solution or a solution of charge generation material, a large amount of binder added has an adverse effect on the sensitivity of the layer, so that the binder content in the charge generation layer is desirably up to 80% by weight, still preferably up to 40% by weight. Many kinds of resin can be used as the binder for the charge generation layer, such as poly(vinyl butyral), poly(vinyl acetate), polyesters, polycarbonates, phenoxy resins, acrylic resins, polyacrylamide, polyamides, poly(vinylpyridine), cellulosic resins, urethane resins, epoxy resins, casein, and poly(vinyl alcohol).

The charge generation layer thus formed is overlaid with the charge transport layer of 5–30μ, preferably 8–20μ, in thickness.

The hydrazone compounds of this invention do not have film-forming ability in themselves, so that the charge transport layer is formed by coating and drying in the usual way of a solution prepared by dissolving each of the hydrazone compounds together with one of the following various binder resins in a suitable solvent. The binder resins for the charge transport layer include acrylics, polystyrenes, polyesters, phenoxy resins, polycarbonates, silicone resins, epoxy resins, urethane resins, and also hole-transporting polymers such as poly(N-vinylcarbazole).

The hydrazone compounds of this invention are hole-transporting materials. Accordingly, when operating a photosensitive member prepared by the lamination in order of conductive layer, charge generation layer, and charge transport layer, it is necessary to negatively charge the surface of charge transport layer. In the exposed areas, upon exposure after charging, holes produced in the charge generation layer are injected into the charge transport layer, then arrive at the surface, and neutralize negative charges to attenuate the surface potential, thus resulting in electrostatic contrasts between exposed and unexposed areas. The latent electrostatic image thus produced is developed with a positively chargeable toner to form a visible image. This visible image can be fixed either directly or after transferred to paper, plastic film, or the like. The latent electrostatic image on the photosensitive member can also be transferred onto the insulating layer of a transfer paper and then developed and fixed. The type of developer, the developing method, or the fixing method in these operations is not limited to specific ones: any of known developers and known developing or fixing methods may be adopted.

Photosensitive members of other types than type (4) are now briefly explained though they are described in detail in the references cited above.

Since a charge transfer complex is formed by combining an electron attractive substance with a hydrazone compound of this invention, a photosensor of type (1) can be obtained by coating a solution of the charge transfer complex and a binder resin in a suitable solvent on a conductive layer or on a bond coating thereof and drying it, in the usual way.

The electron attractive substances usable in this case include low-molecular substances such as chloranil, bromanil, tetracyanoethylene, tetracyanoquinodimethane, 2,4,7-trinitro-9-fluorenone, 2,4,5,7-tetranitrofluorenone, 2,4,7-trinitro-9-dicyanomethylenefluorenone, 2,4,5,7-tetranitroxanthone, and 2,4,8-trinitrothioxanthone; and such polymers of electron attractive substances as described in U.S. Pat. No. 4,122,113. Various kinds of binder stated referring to the photosensitive member of type (4) can be used for this type of photosensitive member.

A photosensitive member of type (2) can be obtained by dissolving a hydrazone compound of this invention and a binder for the charge transport layer of the photosensitive member of type (4) mentioned above in a suitable solvent, further adding one of the various kinds of dye or pigment stated referring to the photosensitive member of type (4), coating this solution on a conductive layer or on a bond layer thereupon, and drying it, in the usual way.

A photosensitive member of type (3) can be obtained by adding one of the various kinds of dye or pigment stated referring to the photosensitive member of type (4), to a hydrazone compound of this invention, which serves as a hole matrix.

A photosensitive member of type (5) can be prepared from three components, i.e., a pyrylium dye such as 2,6-diphenyl-4-(N,N-dimethylaminophenyl)-thiapyrylium perchlorate, a resin, for example polycarbonate, capable of forming a co-crystalline complex with said dye, and a hydrazone compound of this invention.

A photosensitive member of type (6) can be prepared by adding one of the various kinds of charge generation materials stated in reference to the photosensitive member of type (4), to a charge-transfer complex analogous to those for use in the photosensitive member of type (1).

The electrophotographic photosensitive members of this invention can be utilized not only in electrophotographic copying machines but also in a wide range of electrophotographic applications such as laser printers, CRT printers, and electrophotographic printing plate making systems.

An example of process for synthesizing the hydrazone compound of this invention will be described below.

SYNTHETIC PROCESS EXAMPLE

Synthesis of N-ethylphenothiazine-3-aldehyde-N',N'-diphenylhydrazone

To 50 ml of ethanol were added 5.77 g (0.0226 mol) of N-ethylphenothiazine-3-aldehyde, 5.0 g (0.0226 mol) of N,N-diphenylhydrazine hydrochloride, and 2 ml of acetic acid, and the mixture was stirred at room temperature for 1 hour. The resulting liquid was filtered, and the solid fraction was dispersed in a dilute aqueous ammonia, filtered, washed, and then dried. The solid matter obtained was recrystallized from methyl ethyl ketone, giving 3.0 g of yellow crystals, m.p. 137.2°–138.5° C., yield 32%.

Elemental analysis (%):

|   | Calcd. for $C_{27}H_{23}N_3S$ | Found |
| --- | --- | --- |
| C | 79.92 | 76.98 |
| H | 5.51 | 5.48 |
| N | 9.97 | 9.92 |

I.R. absorption spectrum: The absorption at 1670 $cm^{-1}$ (C=O stretching band) observed for the starting aldehyde was disappeared.

Other hydrazone compounds for use in this invention can be synthesized in a similar way.

For illustrating the invention in more detail, the following examples are given.

EXAMPLE 1

A solution of casein in aqueous ammonia (11.2 g of casein, 1 g of 28% aqueous ammonia in 222 ml of water) was coated by means of a Meyer bar on an aluminum plate and dried to form a bond layer of 1.0 g/m².

Then, 5 g of a pigment of the formula

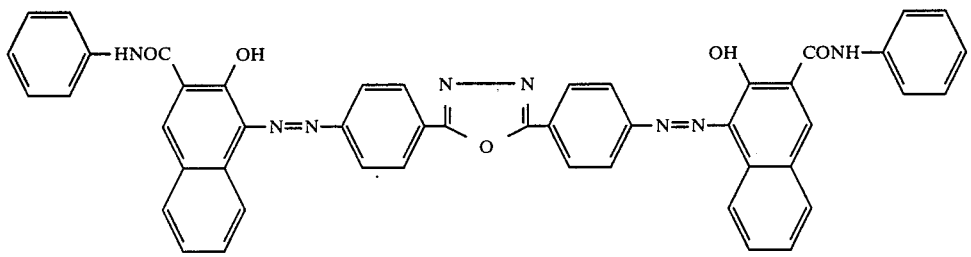

was dispersed in a solution of 2 g of vinyl butyral resin (butyral conversion degree 63 mol%) in 95 ml of ethanol by using a ball mill. The dispersion thus obtained was coated on the bond layer by means of a Meyer bar to form a charge generation layer of 0.2 g/m². Subsequently, a solution of both 5 g of N-ethylphenothiazine-3-aldehyde-N',N'-diphenylhydrazone and 5 g of polycarbonate of 2,2-bis(4-hydroxyphenyl)propane (mol. wt. 30,000) in 70 ml of tetrahydrofuran was coated on the charge generation layer and dried to form a charge transport layer of 10 g/m².

The electrophotographic photosensitive member thus prepared was conditioned at 20° C. under 65% relative humidity, then negatively charged in the static fashion by corona charging at ⊖5 KV using an electrostatic copying paper test device Model SP-428 (supplied by Kawaguchi Denki Co., Ltd.), retained in the dark for 10 seconds, and then exposed to light at 5 lux to examine the charge bearing characteristics. The results showed that Vo was ⊖510 V, Vk 89% and E ½ 5.7 lux.sec. wherein Vo(−V) is initial potential, Vk(%) potential retentivity after standing in a dark place for 10 seconds, and E ½ (lux·sec) exposure quantity for halving initial potential.

EXAMPLE 2

A pigment of the formula

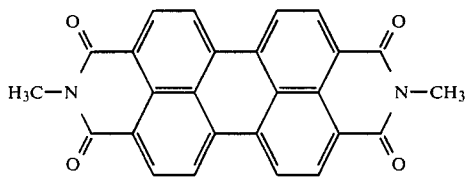

was vacuum-deposited on the bond surface of the same aluminum plate, having the bond layer, as prepared in Example 1, thereby forming a charge generation layer of 0.15µ in thickness. The same charge transport layer as in Example 1 was formed on the charge generation layer to prepare a photosensitive member. The results of the same measurements as in Example 1 were as follows:

Vo ⊖540 V, Vk 89%, E ½ 6.3 lux·sec

EXAMPLES 3-6

A charge generation layer of selenium-tellurium (tellurium content 10% by weight) of 0.8µ in thickness was formed by vacuum deposition on an aluminum plate of 100µ in thickness. A solution of both 5 g of a polyester (Vylon 200, made by Toyobo Co., Ltd.) and 5 g of each hydrazone compound shown in Table 1 in 70 ml of dichloromethane was coated on the charge generation layer and dried to form a charge transport layer of 10 g/m². The charge bearing characteristics of the photosensitive members prepared in this way were measured in the same manner as Example 1. The results are given in Table 1.

TABLE 1

| Example | Hydrazone compound of formula (1) | Vo (−V) | Vk (%) | E½ (lux · sec) |
|---|---|---|---|---|
| 3 | ![structure] C₂H₅ phenothiazine-CH=N-N(phenyl)₂ | 540 | 88 | 5.4 |
| 4 | C₂H₅ phenothiazine-CH=N-N(phenyl)(CH₃) | 550 | 89 | 7.4 |
| 5 | C₂H₅ phenothiazine-CH=N-N(phenyl)(CH₂-phenyl) | 530 | 90 | 7.2 |
| 6 | C₃H₇ phenothiazine-CH=N-N(phenyl)₂ | 560 | 87 | 5.8 |

EXAMPLE 7

To a solution prepared by dissolving 5 g of N-ethylphenothiazine-3-aldehyde-N',N'-diphenylhydrazone and 5 g of poly(N-vinylcarbazole) (mol. wt. about 3×10⁵) in 70 ml of tetrahydrofuran was added 1.0 g of a pigment of the formula

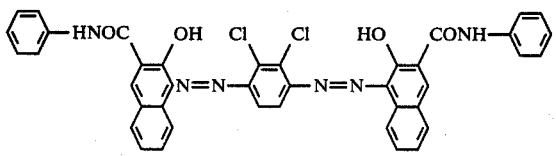

and dispersed by means of a ball mill. The dispersion was coated on the bond surface of the same aluminum plate, having the bond layer, as prepared in Example 1 and dried to form a photosensitive layer of 10 g/m². The charge bearing characteristics of the photosensitive member thus prepared were measured in the same manner as Example 1, except that the charging was positive. The results were as follows:

Vo ⊕500 V, Vk 88%, E ½ 15 lux·sec

EXAMPLE 8

An aluminum substrate of 0.2 mm in thickness was fixed in a vacuum device, which was then thoroughly evacuated, and a gas mixture of hydrogen and silane (15 vol% based on hydrogen) was introduced. Then, a charge generation layer of 0.3μ in thickness of amorphous silicon was formed on the substrate by glow discharge applying a 13.5 MHz high-frequency electric field. After atmospheric pressure was brought back in the vacuum device, the sample plate was taken out and a solution of both 5 g of a hydrazone compound of the formula

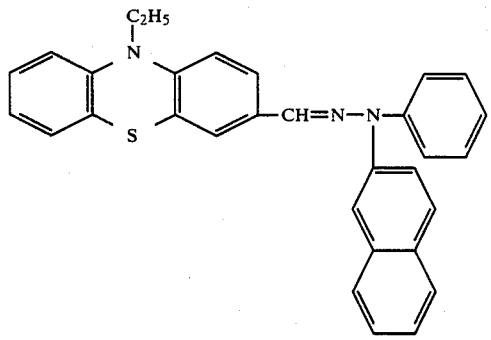

and 5 g of a polyester (Vylon 200, made by Toyobo Co., Ltd.) in 150 ml of dichloromethane was coated on the above-mentioned charge generation layer and dried to form a charge transport layer of 11 g/m². The photosensitive member thus obtained was placed in a charging-exposing test device, corona-charged at ⊖5 KV, and subsequently exposed to a pattern of light, which was projected from a tungsten light source through a transmission type test chart. A good toner image was obtained on the surface of the photosensitive member by cascading a positively chargeable developer (containing toner and carrier) thereupon immediately after the exposure.

EXAMPLE 9

A charge generation layer and a charge transport layer were successively laminated on an aluminum plate 0.2 mm thick in the same manner as Example 8. Using the photosensitive member thus obtained, a good toner image was obtained in the same procedure as Example 8, except that the corona charging was effected at ⊕5 KV and the developer used was of a negatively chargeable type.

EXAMPLE 10

A bond layer of 1.0 g/m² was formed on an aluminum plate by coating an aqueous ammonia solution of casein (11.2 g of casein, 1 g of 28% aqueous ammonia in 222 ml of water) by means of a Meyer bar and drying it.

Subsequently, a dispersion of 5 g of a disazo pigment of the formula

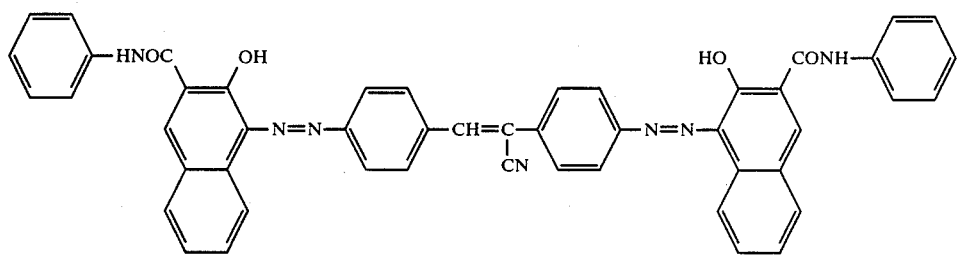

in a solution of 2 g of vinyl butyral resin (butyral conversion degree 63 mol%) in 95 ml of ethanol was coated on the bond layer and dried to form a charge generation layer of 0.2 g/m².

Then, a solution of both 5 g of a hydrazone compound of the formula

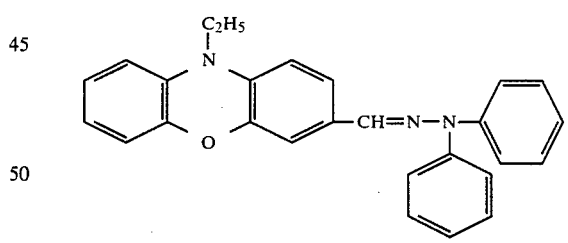

(designated as compound No. H-1) and 5 g of polycarbonate of 2,2-bis(4-hydroxyphenyl)propane (mol. wt. about 30,000) in 150 ml of dichloromethane was coated on the charge generation layer and dried to form a charge transport layer of 10 g/m².

The photosensitive member thus prepared was charged at ⊖5 KV in the static process using the electrostatic copying paper test device Model SP-428 mentioned in Example 1, retained in a dark place for 10 seconds, and exposed to light at 5 lux to examine the charge bearing characteristics. The results were as follows:

Vo ⊖530 V, Vk 90%, E ½ 7.0 lux·sec

EXAMPLES 11-20

A charge generation layer of 0.15μ in thickness was formed on an aluminum plate by vacuum deposition of a pigment of the formula

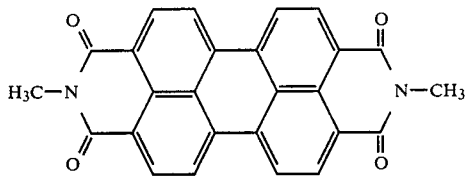

Then, a solution of both 5 g of a polyester resin (Vylon 200, made by Toyobo Co., Ltd.) and 5 g of each of hydrazone compound, shown in Table 2, in 150 ml of dichloromethane was coated on the charge generation layer and dried to form a charge transport layer of 11 g/m².

The charge bearing characteristics of the photosensitive member prepared in this way were examined in the same procedure as Example 10. The results are given in Table 3.

TABLE 2

Hydrazone compound

| Example | Compound | $R_1$ | $R_2$ | $R_3$ |
|---|---|---|---|---|
| 11 | H-2 | $-C_2H_5$ | –⟨phenyl⟩ | $-CH_3$ |
| 12 | H-3 | $-C_2H_5$ | –⟨phenyl⟩ | $-CH_2-$⟨phenyl⟩ |
| 13 | H-4 | $-C_2H_5$ | –⟨naphthyl⟩ | –⟨phenyl⟩ |
| 14 | H-5 | $-(CH_2)_3CH_3$ | –⟨phenyl⟩ | –⟨phenyl⟩ |
| 15 | H-6 | $-CH_2-$⟨phenyl⟩ | –⟨phenyl⟩ | –⟨phenyl⟩ |
| 16 | H-7 | $-CH_2-$⟨phenyl⟩ | –⟨phenyl⟩ | $-CH_3$ |
| 17 | H-8 | $-CH_2-$⟨phenyl⟩$-Cl$ | –⟨phenyl⟩ | –⟨phenyl⟩ |
| 18 | H-9 | $-CH_2CH_2-$⟨phenyl⟩ | –⟨phenyl⟩ | –⟨phenyl⟩ |
| 19 | H-10 | $-CH_2-$⟨naphthyl⟩ | –⟨phenyl⟩ | –⟨phenyl⟩ |
| 20 | H-11 | $-CH_2-$⟨phenyl⟩$-C_2H_5$ | –⟨phenyl⟩ | $-CH_3$ |

TABLE 3

| Example | Compound | Vo (⊖V) | Vk (%) | E½ (lux·sec) |
|---|---|---|---|---|
| 11 | H-2 | 540 | 90 | 11.2 |
| 12 | H-3 | 550 | 91 | 8.0 |
| 13 | H-4 | 540 | 88 | 7.2 |
| 14 | H-5 | 560 | 90 | 8.0 |
| 15 | H-6 | 560 | 91 | 7.5 |
| 16 | H-7 | 540 | 93 | 10.5 |
| 17 | H-8 | 530 | 89 | 7.8 |
| 18 | H-9 | 560 | 94 | 7.5 |
| 19 | H-10 | 550 | 90 | 7.8 |
| 20 | H-11 | 560 | 89 | 10.8 |

EXAMPLE 21

A dispersion was prepared by adding 1.0 g of β-form copper phthalocyanine to a solution of both 5 g of the same hydrazone compound (Compound No. H-2) as used in Example 11 and 5 g of poly(N-vinylcarbazole) (mol. wt. about $3 \times 10^5$) in 150 ml of dichloromethane. The dispersion was coated by means of a Meyer bar on the casein layer of the same aluminum plate coated with casein as used in Example 10, and dried to form a photosensitive layer of 12 g/m².

The charge bearing characteristics of the photosensitive member thus prepared were measured in the same procedure as Example 10, except that the charging was positive. The results were as follows:

Vo ⊕510 V, Vk 86%, E ½ 26 lux·sec

EXAMPLE 22

A charge generation layer of selenium-tellurium (tellurium 10% by weight) 0.8μ thick was formed on an aluminum plate by vacuum deposition.

Then, a charge transport layer was formed in the same way as Example 13. The charge bearing characteristics of the photosensitive member thus obtained were measured in the same procedure as Example 10. The results were as follows:

Vo ⊖540 V, Vk 90%, E ½ 6.3 lux·sec

EXAMPLE 23

An aluminum substrate 0.2 mm thick was fixed in a vacuum device and after thorough evacuation of the device, a gas mixture of hydrogen and silane (15 vol% based on hydrogen) was introduced. A charge generation layer of amorphous silicon 0.3μ thick was formed on the substrate by glow discharge applying a 13.5 MHz high-frequency electric field.

After atmospheric pressure was brought back in the vacuum device, the sample plate was taken out, and a charge transport layer was formed on the charge generation layer in the same way as Example 10.

The photosensitive member thus obtained was placed in a charging-exposing test device, subjected to corona charging at ⊖5 KV, and subsequently exposed to a pattern of light, which was projected from a tungsten light source through a transmission type test chart. A good toner image was obtained on the photosensitive member by cascading a positively chargeable developer (containing toner and carrier) thereupon immediately after the exposure.

EXAMPLE 24

A charge generation layer and a charge transport layer were successively laminated on an aluminum plate 0.2 mm thick in the same way as Example 23.

Using the photosensitive member thus obtained, a good toner image was obtained in the same way as Example 23, except that the corona charging was effected at ⊕5 KV and a negatively chargeable developer was used.

EXAMPLES 25–33

An aqueous ammonia solution of casein (11.2 g of casein, 1 g of 28% aqueous ammonia in 222 ml of water) was coated on an aluminum plate and dried to form a bond layer of 1.0 g/m².

Then, a dispersion of 5 g of a disazo pigment of the formula:

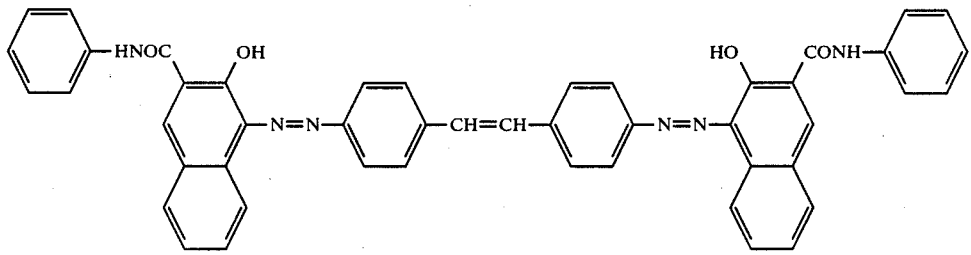

in a solution of 2 g of vinyl butyral resin (butyral conversion degree 63 mol%) in 95 ml of ethanol was coated on the bond layer and dried to form a charge generation layer of 0.2 g/m².

A solution of both 5 g of each hydrazone compound shown in Table 4 and 5 g of polycarbonate of 2,2,-bis(4-hydroxyphenyl)propane (mol. wt. about 30,000) in 150 ml of dichloromethane was coated on the charge generation layer and dried to form a charge transport layer of 10 g/m².

The photosensitive member thus prepared was subjected to corona charging in the static process at ⊖5 KV using the electrostatic copying paper test device Model SP-428 mentioned in Example 1, retained in a dark place for 10 seconds, and then exposed to light at 5 lux to examine the charge bearing characteristics. The results are shown in Table 5.

TABLE 4

Hydrazone compounds

| Example | Compound No. | $R_1$ | $R_2$ | $R_3$ |
|---|---|---|---|---|
| 25 | H-12 | —$C_2H_5$ | —Ph | —Ph |
| 26 | H-13 | —$C_2H_5$ | —Ph | —$CH_3$ |
| 27 | H-14 | —$C_2H_5$ | —Ph | —$CH_2$—Ph |
| 28 | H-15 | —$C_2H_5$ | —naphthyl | —Ph |
| 29 | H-16 | —$(CH_2)_3CH_3$ | —Ph | —Ph |
| 30 | H-17 | | —$CH_2$—Ph | —Ph, —Ph |
| 31 | H-18 | —$C_2H_4$—Ph | —Ph | —$CH_3$ |
| 32 | H-19 | —$(CH_2)_2CH_3$ | —Ph | —Ph |
| 33 | H-20 | —$CH_2$—Ph—Cl | —Ph | —$CH_3$ |

TABLE 5

| | | Charge bearing characteristics | | |
|---|---|---|---|---|
| Examples | Compound No. | Vo (−V) | Vk (%) | E ½ (lux · sec) |
| 25 | H-12 | 500 | 89 | 10 |
| 26 | H-13 | 530 | 91 | 15 |
| 27 | H-14 | 510 | 90 | 13 |
| 28 | H-15 | 500 | 89 | 11 |
| 29 | H-16 | 540 | 94 | 12 |
| 30 | H-17 | 490 | 88 | 13 |

TABLE 5-continued

| Examples | Compound No. | Vo (−V) | Vk (%) | E ½ (lux · sec) |
|---|---|---|---|---|
| 31 | H-18 | 480 | 87 | 16 |
| 32 | H-19 | 510 | 91 | 12 |
| 33 | H-20 | 480 | 89 | 15 |

EXAMPLE 34

A charge generation layer of selenium-tellurium (tellurium 10% by weight) 0.8μ thick was formed on an aluminum plate by vacuum deposition.

Then, a charge transport layer was formed in the same manner as Example 25 to prepare a photosensitive member. The results of measurements of charge bearing characteristics carried out in the same way as Example 25 were as follows:

Vo ⊖520 V, Vk 93%, E ½ 9.0 lux·sec

EXAMPLE 35

A charge generation layer 0.15μ thick of a pigment having the formula

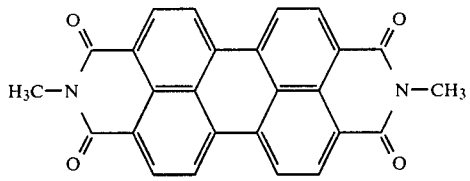

was formed on an aluminum plate by vacuum deposition.

Then, a solution of both 5 g of a polyester (Vylon 200, made by Toyobo Co., Ltd.) and 5 g of the same hydrazone compound (No. H-15) as used in Example 28 in 150 ml of dichloromethane was coated on the charge generation layer and dried to form a charge transport layer of 11 g/m². The charge bearing characteristics of the photosensitive member thus prepared were measured in the same way as Example 25. The results were as follows:

Vo ⊖520 V, Vk 91%, E ½ 12 lux·sec

EXAMPLE 36

An aluminum substrate 0.2 mm thick was fixed in a vacuum device, which was then thoroughly evacuated, and a gas mixture of hydrogen and silane (15 vol% based on hydrogen) was introduced. Then, a charge generation layer 0.3μ thick of amorphous silicon was formed on the substrate by glow discharge applying a 13.5 MHz high-frequency electric field.

After atmospheric pressure was brought back in the vacuum device, the sample plate was taken out, and a charge transport layer was formed on the charge generation layer in the same way as Example 25. The photosensitive member thus obtained was placed in a charging-exposing test device, corona-charged at ⊖ 5 KV, and subsequently exposed to a pattern of light, which was projected from a tungsten light source through a transmission type test chat. A good toner image was obtained on the surface of the photosensitive member by cascading a positively chargeable developer (containing toner and carrier) thereupon immediately after the exposure.

EXAMPLE 37

The same charge generation layer and the same charge transport layer as those prepared in Example 36 were successively laminated on an aluminum plate 0.2 mm thick.

A good toner image was obtained using the photosensitive member thus obtained in the same way as Example 36, except that the corona charging was effected at ⊕5 KV and a negatively chargeable developer was used.

EXAMPLE 38

A dispersion was prepared by adding 1.0 g of β-form copper phthalocyanine to a solution of both 5 g of the same hydrazone compound (compound No. H-13) as used in Example 26 and 5 g of poly(N-vinylcarbazole) (mol. wt. about 3×10⁵) in 150 ml of dichloromethane. The dispersion was coated on the casein layer of the same aluminum plate coated with casein as used Example 1, and dried to form a photosensitive layer of 11 g/m². The charge bearing characteristics of the photosensitive member thus prepared were measured in the same way as Example 25, except that the charging was negative. The results were as follows:

Vo ⊖500 V, Vk 88%, E ½ 28 lux·sec

EXAMPLE 39

A solution of casein in aqueous ammonia (11.2 g of casein, 1 g of 28% aqueous ammonia in 222 ml of water) was coated by means a Meyer bar on an aluminum plate and dried to form a bond layer of 1.0 g/m². Then, 5 g of a pigment having the formula

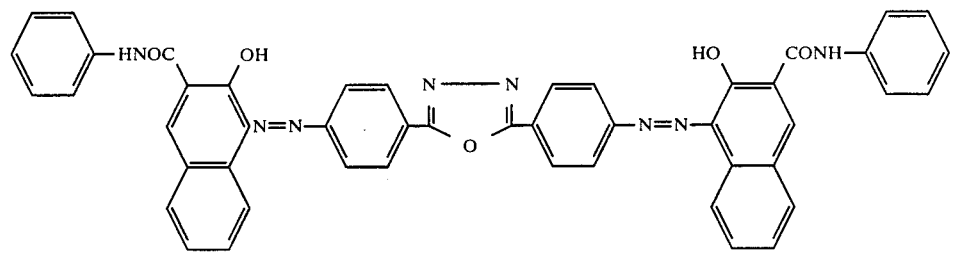

was dispersed in a solution of 2 g of vinyl butyral resin (butyral conversion degree 63 mol%) in 95 ml of ethanol by means of a ball mill, and the resulting dispersion was coated on the bond layer by means of a Meyer bar and dried to form a charge generation layer of 0.2 g/m².

Then, a solution of both 5 g of p-pyrolidinobenzaldehyde-N',N'-diphenylhydrazone and 5 g of polycarbonate of 2,2-bis(4-hydroxyphenyl)propane (mol. wt. about 30,000) in 70 ml of tetrahydrofuran was coated on the charge generation layer and dried to form a charge transport layer of 10 g/m².

The photosensitive member thus prepared was conditioned at 20° C. under 65% relative humidity, then charged in the static process by corona charging at ⊖5 KV using the electrostatic copying paper test device mentioned in Example 1, retained in a dark place for 10 seconds, and then exposed to light at 5 lux to examine the charge bearing characteristics. The results were as follows:

Vo ⊖560 V, Vk 91%, E ½ 7.5 lux·sec thickness. Then, a solution of both 5 g of a polyester resin (Vylon 200, made by Toyobo Co., Ltd.) and 5 g of each hydrazone compound shown in Table 6 in 70 ml of tetrahydrofuran was coated on the charge generation layer and dried to form a charge transport layer of 11 g/m². The charge bearing characteristics of the photosensitive member thus prepared were examined in the same way as Example 39. The results are shown in Table 6.

TABLE 6

| Example | Hydrazone compound of formula (1) | Vo (−V) | Vk (%) | E ½ (lux · sec) |
|---|---|---|---|---|
| 40 | ![structure] | 580 | 93 | 5.8 |
| 41 | ![structure] | 590 | 91 | 14.3 |
| 42 | ![structure] | 580 | 90 | 10.0 |
| 43 | ![structure] | 550 | 90 | 13.2 |

EXAMPLE 44

To a solution prepared by dissolving 5 g of p-pyrolidinobenzaldehyde-N',N'-diphenylhydrazone and 5 g of poly(N-vinylcarbazole) (mol. wt. about $3 \times 10^5$) in 70 ml of tetrahydrofuran was added 1.0 g of a pigment of the formula

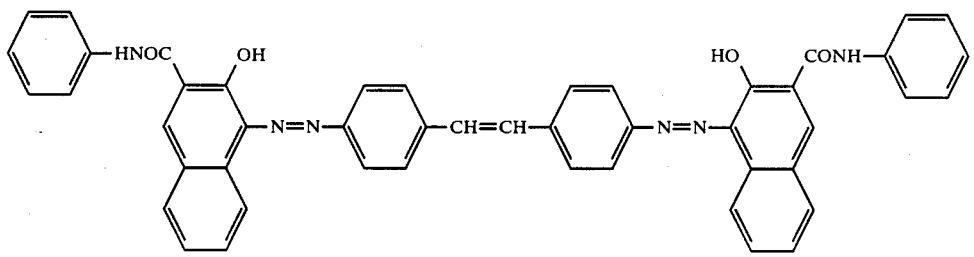

EXAMPLES 40–43

A charge generation layer 0.8μ thick of selenium-tellurium (tellurium content 10% by weight) was formed by vacuum deposition on an aluminum plate of 100μ in and dispersed by means of a ball mill. The dispersion was coated by means of a Meyer bar on the casein layer of the same aluminum plate coated with casein as used in Example 39 and dried to form a 10 g/m² coating. The charge bearing characteristics of the photosensitive member thus prepared were measured in the same way as Example 39, except that the charging was positive. The results were as follows:

Vo⊕520 V, Vk 86%, E ½ 14 lux·sec

EXAMPLE 45

An aluminum plate of 0.2 mm in thickness was fixed in a vacuum device, which was then throughly evacuated, and a gas mixture of hydrogen and silane (15 vol% based on hydrogen) was introduced. Then, a charge generation layer of 0.3μ in thickness of amorphous silicon was formed on the substrate by glow discharge applying a 13.5 MHz high-frequency electric field. After atmospheric pressure was brought back in the vacuum device, the sample plate was taken out and a solution of both 5 g of a polyester resin (Vylon 200, made by Toyobo Co., Ltd.) and 5 g of a hydrazone of the formula

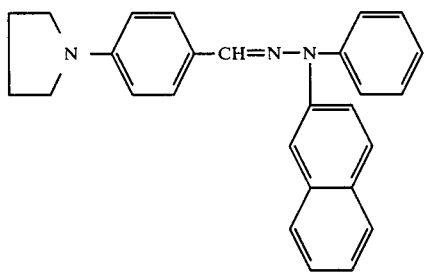

in 150 ml of dichloromethane was coated in the charge generation layer and dried to form a charge transport layer of 10 g/m². The photosensitive member thus obtained was placed in a charging-exposing test device, corona-charged at ⊖5 KV, and subsequently exposed to a pattern of light, which was projected from a tungsten light source through a transmission type test chart. A good toner image was obtained on the surface of the photosensitive member by cascading a positively chargeable developer (containing toner and carrier) thereupon immediately after the exposure.

EXAMPLE 46

The same charge generation layer and the same charge transport layer as those of Example 45 were successively laminated on an aluminum plate 0.2 mm thick. A good toner image was obtained using the photosensitive member thus obtained, in the same way as Example 45, except that the charging was effected at ⊕5 KV and a negatively chargeable developer was used.

EXAMPLE 47

A solution of casein in aqueous ammonia (11.2 g of casein, 1 g of 28% aqueous ammonia in 222 ml of water) was coated by means of a Meyer bar on an aluminum plate to form a bond layer of 1.0 g/m². Then, 5 g of a pigment of the formula

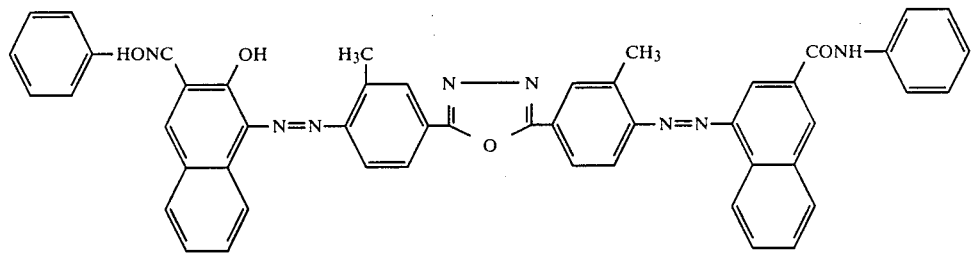

was dispersed in a solution of 2 g of vinyl butyral resin (butyral conversion degree 63 mol%) in 95 ml of ethanol using a ball mill. The resulting dispersion was coated by means of a Meyer bar on the bond layer and dried to form a charge generation layer of 0.2 g/m². Subsequently, a solution of both 5 g of glyoxal-bis(N',N'-diphenylhydrazone) and 5 g of polycarbonate of 2,2-bis(4-hyoxyphenyl)propane (mol. wt. about 30,000) in 70 ml of dichloromethane was coated on the charge generation layer and dried to form a charge transport layer of 1.0 g/m².

The photosensitive member thus prepared was conditioned at 20° C. under 65% relative humidity, then corona-charged at ⊖5 KV in the static process using the electrostatic copying paper test device mentioned in Example 1, retained in a dark place for 10 seconds, and exposed to light at 5 lux to examine the charge bearing characteristics. The results were as follows:

Vo⊖600 V, Vk 98%, E ½ 9.3 lux·sec

EXAMPLE 48

To a solution prepared by dissolving 5 g of glyoxal-bis(N',N'-diphenylhydrazone) and 5 g of poly(N-vinylcarbazole) (mol. wt. about 3×10⁵) in 70 ml of dichloromethane was added 1.0 g of a pigment of the formula

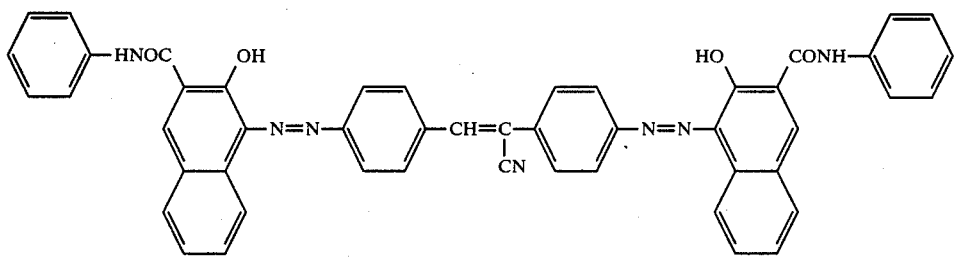

and dispersed by means of a ball mill. The resulting dispersion was coated by means of a Meyer bar on the casein layer of the same aluminum plate coated with sensitive member prepared in this way were measured in the same way as Example 47. The results are given in Table 7.

TABLE 7

| Example | Hydrazone compound of formula 1 | Charge bearing characteristics | | |
|---|---|---|---|---|
| | | Vo (−V) | Vk (%) | E ½ (lux · sec) |
| 49 | ⟨Ph⟩–N(–Ph)–N=CH–CH=N–N(–Ph)–⟨Ph⟩ | 590 | 93 | 7.0 |
| 50 | ⟨Ph⟩–N(C₂H₅)–N=CH–CH=N–N(C₂H₅)–⟨Ph⟩ | 600 | 92 | 25 |
| 51 | ⟨Ph⟩–N(naphthyl)–N=CH–CH=N–N(naphthyl)–⟨Ph⟩ | 610 | 90 | 6.8 |
| 52 | ⟨Ph⟩–N((CH₂)₂OCH₃)–N=CH–CH=N–N((CH₂)₂OCH₃)–⟨Ph⟩ | 580 | 90 | 10.2 | casein as used in Example 47 and dried to form a photosensitive layer of 10 g/m$^2$. The charge bearing characteristics of the photosensitive member thus prepared were measured in the same way as Example 47, except that the charging was positive. The results were as follows:

Vo ⊕540 V, Vk 90%. E ½ 16 lux·sec

EXAMPLES 49–52

A charge generation layer of selenium-tellurium (tellurium content 10% by weight) of 0.8μ in thickness was formed by vacuum deposition on an aluminum plate of 100μ in thickness. A solution of both 5 g of a polyester resin (Vylon 200, made by Toyobo Co., Ltd.) and 5 g of each hydrazone compound shown in Table 7 in 70 ml of dichloromethane was coated on the charge generation layer and dried to form a charge transport layer of 10 g/m$^2$. The charge bearing characteristics of the photo-

EXAMPLE 53

An aluminum base plate of 0.2 mm in thickness was fixed in a vacuum device, which was then thoroughly evacuated, and a gas mixture of hydrogen and silane (15 vol% based on hydrogen) was introduced. Then, a charge generation layer 0.3μ thick of amorphous silicon was formed on the substrate by glow discharge applying a 13.5 MHz high-frequency electric field. After atmosphere pressure was brought back in the vacuum unit, the sample plate was taken out, and a charge transport layer was formed on the charge generation layer in the same way as Example 47. The photosensitive member thus obtained was placed in a charging-exposing test device, corona-charged at ⊖5 KV, and subsequently exposed to a pattern of light, which was projected from a tungsten light source through a transmission type test chart. A good toner image was obtained on the surface of the photosensitive member by cascading a positively chargeable developer (containing toner and carrier) thereupon immediately after the exposure.

EXAMPLE 54

The same charge generation layer and the same charge transport layer as those of Example 53 were successively laminated on an aluminum plate 0.2 mm thick. A good toner image was obtained using the photosensitive member thus obtained, in the same way as Example 53, except that the corona charging was effected at ⊕5 KV and a negatively chargeable developer was used.

What we claim is:

1. An electrophotographic photosensitive member which comprises a conductive support, a charge generation layer, and a charge transport layer which contains a hydrazone compound represented by the formula

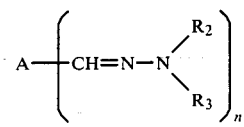

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not alkyls at the same time, n is 1 or 2, when n is 1, A is

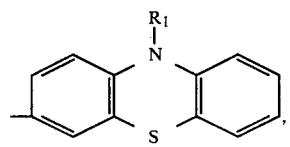

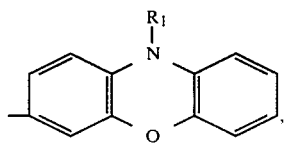

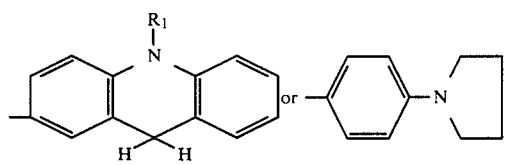

wherein $R_1$ is $C_1$–$C_5$ alkyl, unsubstituted aralkyl, or substituted aralkyl, and when n is 2, A represents a direct single bond between two

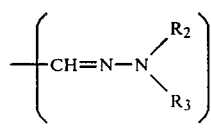

radicals and a binder.

2. An electrophotographic photosensitive member according to claim 1, wherein the electrophotographic photosensitive member comprises on the charge generation layer the charge transport layer containing a hydrazone compound represented by the formula

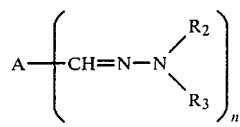

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not alkyls at the same time, n is 1 or 2, when n is 1, A is

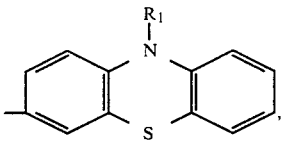

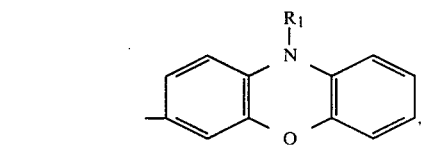

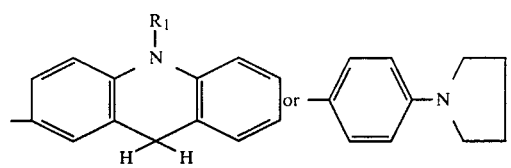

wherein $R_1$ is $C_1$–$C_5$ alkyl, unsubstituted aralkyl, or substituted aralkyl, and when n is 2, A represents a direct single bond between two

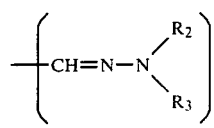

radicals and a binder.

3. An electrophotographic photosensitive member according to claim 2, wherein the electrophotographic photosensitive member comprises on a conductive support in sequence from bottom to top a bond layer, a charge generation layer, and a charge transport layer which contains a hydrazone compound represented by the formula:

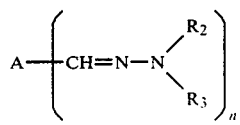

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not alkyls at the same time, n is 1 or 2, when n is 1, A is:

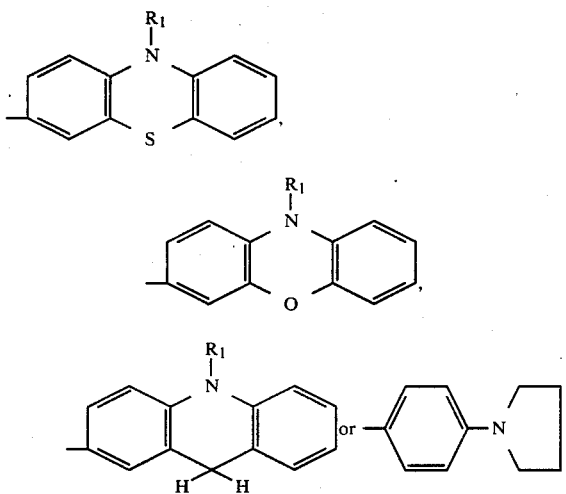

wherein $R_1$ is $C_1$-$C_5$ alkyl, aralkyl, or substituted aralkyl, and when an is 2, A represents a direct single bond between two

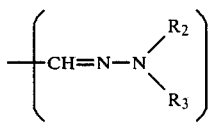

radicals and a binder.

4. An electrophotographic photosensitive member according to claim 1, wherein said binder contained in the transport layer is at least one polymer selected from the group consisting of acrylic resins, polystyrene resins, polyester resins, phenoxy resins, polycarbonate resins, silicone resins, epoxy resins, polyurethane resins, and poly(N-vinylcarbazole).

5. An electrophotographic photosensitive member according to any of claim 1, 2 or 3, wherein said charge transport layer has a thickness of 5-30μ.

6. An electrophotographic photosensitive member according to claim 5, wherein said charge transport layer has a thickness of 8-20μ.

7. An electrophotographic photosensitive member according to any of claims 1, 2 or 3, wherein said hydrazone compound in the one selected from the group consisting of N-ethylphenothiazine-3-aldehyde-N',N'-diphenylhydrazone, N-ethylphenoxazine-3-aldehyde-N',N'-diphenylhydrazone, p-pyrolidinobenzaldehyde-N',N'-diphenylhydrazone, and glyoxal-bis(N',N'-diphenylhydrazone).

8. An electrophotographic photosensitive member according to claim 1, wherein said charge generation layer contains a compound selected from the group consisting of selenium, selenium-tellurium, selenium-arsenic, cadmium sulfide, pyrylium dyes, thiopyrylium dyes, triarylmethane dyes, thiazine dyes, cyanine dyes, phthalocyanine pigments, perylene pigments, indigo pigments, thioindigo pigments, quinacridone pigments, azo pigments, and polycyclic quinone pigments.

9. An electrophotographic photosensitive member according to claim 1, wherein said charge generation layer contains a disazo pigment.

10. An electrophotographic photosensitive member according to claim 1, wherein said charge generation layer contains both a disazo pigment and a binder.

11. An electrophotographic photosensitive member according to claim 10, wherein said binder is a polymer selected from the group consisting of poly(vinyl butyral), poly(vinyl acetate), polyesters, polycarbonates, phenoxy resins, acrylic resins, polyacrylamide, polyamides, polyvinylpyridine resins, cellulosic resins, urethane resins, epoxy resins, casein, and poly(vinyl alcohol).

12. An electrophotographic photosensitive member according to claim 1, wherein said charge generation layer comprises a vacuum-deposited layer of selenium-tellurium, or a perylene dye.

13. An electrophotographic photosensitive member according to claim 3, wherein said bond layer contains a high-molecular compound selected from the group consisting of casein, poly(vinyl alcohol), water-soluble ethyleneacrylic acid copolymer, and nitrocellulose.

14. An electrophotographic photosensitive member according to claim 1, wherein the electrophotographic photosensitive member comprises a photosensitive layer containing a charge generation material and a hydrazone compound represented by the formula

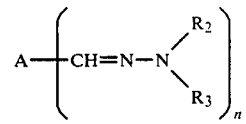

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not alkyls at the same time, n is 1 or 2, when n is 1, A is

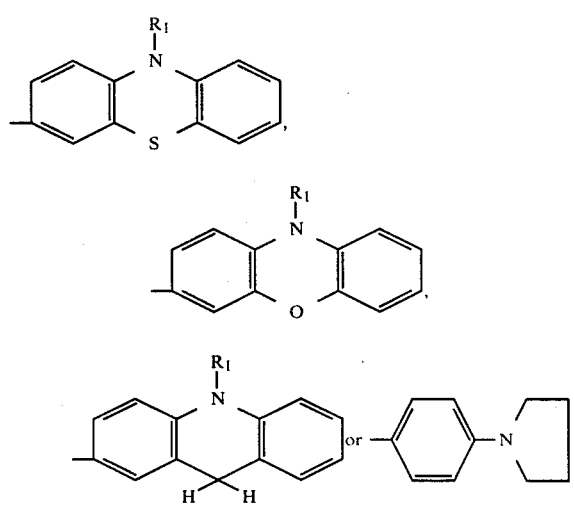

wherein $R_1$ is $C_1$-$C_5$ alkyl, unsubstituted aralkyl or substituted aralkyl, and when n is 2, A represents a direct single bond between two

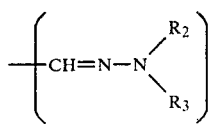

radicals and a binder.

15. An electrophotographic photosensitive member according to claim 14, wherein the electrophotographic photosensitive member comprises a photosensitive layer containing a charge generation material, poly(N-vinylcarbazole), and a hydrazone compound represented by the formula

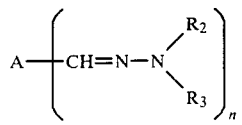

wherein $R_2$ and $R_3$ are each unsubstituted alkyl or substituted alkyl, unsubstituted aralkyl or substituted aralkyl, or unsubstituted aryl or substituted aryl, with the proviso that $R_2$ and $R_3$ are not alkyls at the same time, n is 1 or 2, when n is 1, A is

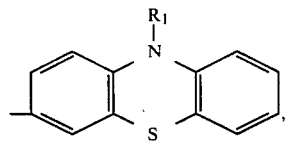

—continued

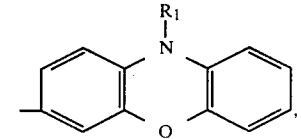

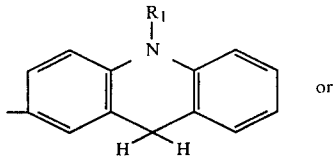

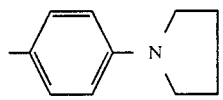

wherein $R_1$ is $C_1$-$C_5$ alkyl, unsubstituted aralkyl, or substituted aralkyl, and when n is 2, A represents a direct single bond between two

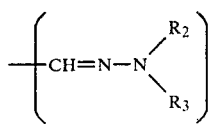

radicals.

16. An electrophotographic photosensitive member according to any of claim 14 or 15, wherein the charge generation material is a diazo pigment.

17. An electrophotographic photosensitive member according to any of claim 14 or 15, wherein the charge generation material is a β-form of copper phthalocyanine.

18. An electrophotographic photosensitive member according to any of claim 14 or 15, wherein the hydrazone compound is N-ethylphenothiazine-3-aldehyde-N',N'-diphenylhydrazone or N-ethylphenoxazine-3-aldehyde-N',N'-diphenylhydrazone.

* * * * *

UNITED STATES PATENT AND TRADEMARK OFFICE
CERTIFICATE OF CORRECTION

PATENT NO. : 4,554,231

DATED : November 19, 1985

INVENTOR(S) : Shozo Ishikawa, et al.

It is certified that error appears in the above-identified patent and that said Letters Patent is hereby corrected as shown below:

```
Column  5, line 27,    "type, (1)-(7)," should be --types, (1)-(7),--.
Column 14, line 56,    "was disappeared." should be --disappeared.--.
Column 24, line 11,    "test chat." should be --test chart.--.
Column 24, line 35-36, "used Example 1," should be --used in
                        Example 1,--.
Column 25, lines 1-2,  "p-pyrolidinobenzaldehyde-" should be
                        --p-pyrrolidinobenzaldehyde--.
Column 26, lines 46-7, "p-pyrolidinobenzaldehyde-" should be
                        --p-pyrrolidinobenzaldehyde--.
Column 27, line 60,    "coated in the" should be --coated on the--.
Column 28, line 49,    "4-hyoxyphenyl" should be --4-hydroxyphenyl--.
Column 33, line 23,    "when an is 2," should be --when n is 2,--.
Column 33, line 50,    "in the one" should be --is the one--.
Column 33, line 53,    "p-pyrolidinobenzaldehyde-" should be
                        --p-pyrrolidinobenzaldehyde--.
Column 34, line 23,    "ethyleneacrylic acid copolymer," should
                        be --ethylene-acrylic acid copolymers,--
Column 36, line 34,    "diazo pigment" should be --disazo pigment--.
```

Signed and Sealed this

Twentieth Day of January, 1987

Attest:

DONALD J. QUIGG

*Attesting Officer*  *Commissioner of Patents and Trademarks*